ated June 19, 1962

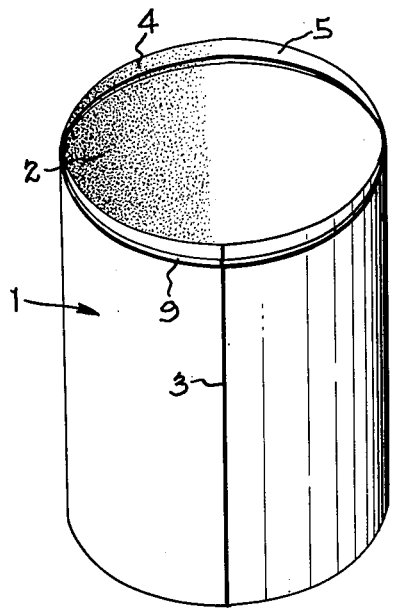
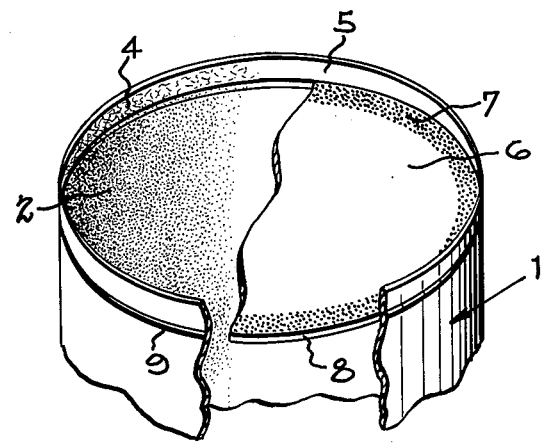
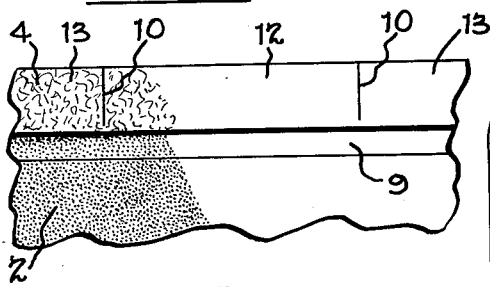
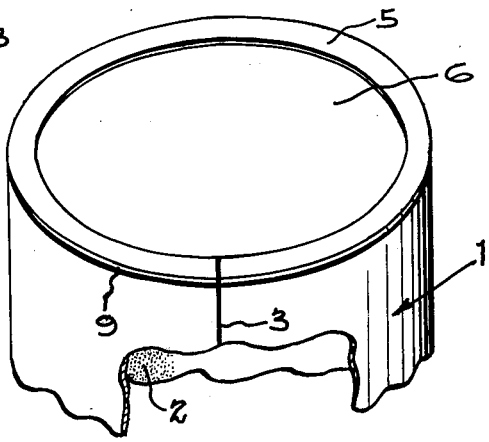
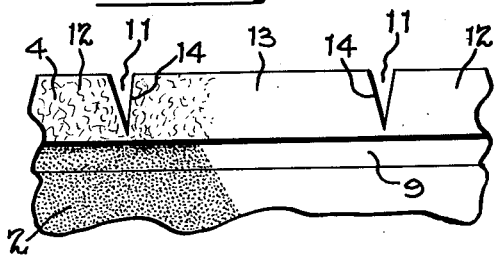
Fig. 1
Fig. 2
Fig. 4
Fig. 3
Fig. 5
INVENTOR.
NORMAN A. LEIBREICH.
BY
DES JARDINS, ROBINSON, TRITLE & SCHENK.
HIS ATTORNEYS.

3,039,371
FIBERBOARD DRUM AND METHOD OF MANUFACTURE

Norman A. Leibreich, Cincinnati, Ohio, assignor, by mesne assignments, to The Mead Corporation, a corporation of Ohio
Filed Apr. 4, 1958, Ser. No. 726,461
2 Claims. (Cl. 93—55.1)

This invention relates to a fiberboard drum container and its method of manufacture, pertaining particularly to a fiberboard drum container which is formed from a paperboard blank bent into cyclindrical tubular form and having one marginal end folded radially inwardly to lap over the marginal outer surface of a fiberboard disc that is inserted within the open end of the tubular form to be adhesively sealed by resin emulsion set or reacted in situ by pressure applied to the lapped portion for securely bonding it to the closure disc.

The resin emulsion is one having the solid as the internal phase and the liquid as the external phase so that the liquid phase is squeezed out to be separated and removed from the solid phase which is pressure reacted to set and be resistant to liquids. Heretofore the infolded end of the drum has been stapled to the bottom insert disc or adhered by adhesive which is not permanently set or reacted to be resistant to the contents of the container. Since the adhesive previously used was not permanently set or reacted, a permanent bond has not been obtained that is resistant to water, acid, oil, alkalies, solvents and other such liquids to which the container might be subjected, more particularly from the contents to be packaged within the container.

Accordingly, one of the main objects of the present invention is a fiberboard drum container having a lapped end pressure bonded or reacted to the inset closure disc.

Another object of the invention is a fiberboard drum container having a lapped end bonded to the closure disc by a pressure reacted adhesive.

Another object of the invention is a fiberboard drum container having a lapped end pressure bonded by means of a polyvinyl alcohol emulsion.

Another object of the invention is a fiberboard drum container having a lapped end bonded by a resin emulsion having a liquid outer phase which is squeezed from the internal solid phase to retain only the solid phase and have it pressure set or reacted in situ.

Further objects, and objects relating to details of construction and economies of operation, will readily appear from the detailed description to follow. In one instance, the objects of the invention have been accomplished by a device and means set forth in the following specification. The invention is clearly defined and pointed out in the appended claims. Structures constituting preferred embodiments of the invention are illustrated in the accompanying drawings, forming a part of this specification, in which:

FIG. 1 is a perspective view of a tubular drum coated on its inner surface to provide a lining.

FIG. 2 is an enlarged perspective view of the end of the tubular drum with the disc closure inserted in position.

FIG. 3 is an enlarged perspective view of the closed end of the finished drum container.

FIGS. 4 and 5 are other modified forms of drum containers.

Referring specifically to the drawings in which like numerals represent like parts, numeral 1 is a fiberboard of tubular form, which may be of laminated or nonlaminated structure. If laminated, the inner and outer plies are preferably of conventional kraft paper which may be either wet or dry finished. So, too, if the fiberboard be of non-laminated construction, its opposite surfaces are wet or dry finished as may be desired. In either construction, the surface of the fiberboard is pervious to liquids, and the inner surface is lined with a coating 2 of any conventional composition. The drum containers are frequently used for packing such materials as asphalt, rubber and the like which is poured in place in a liquid condition to be hardened upon cooling. For packaging such materials, the interior surface of the drum is lined with any conventional coating material that is commonly used for the purpose of rendering the drum impervious to absorption from the contents contained within the drum. The tubular form is made from a fiberboard blank with its side edges overlapped to any desired extent for forming the lap joint 3 extending lengthwise of the tubular form.

If the tubular form be lined with the impervious coating material 2, such is removed from the inside surface 4 of end 5 which is to be lapped over an insert enclosure 6. The coating material 2 is preferably mechanically removed from the inside surface of the end 5, and, in doing so, the surface 4 of the fiberboard is scuffed to some extent, thereby loosening the free ends of the fibers into a napped surface which is previous to liquid and will be embedded in the adhesive film layer 7.

This film layer 7 is applied to surround the outer margin of the fiberboard disc 6 that is adapted to be inserted within the open end of the tubular drum with its peripheral edge 8 seated within an annular groove 9 formed in the wall of said tubular form. This annular groove 9 is formed by scoring which facilitates bending of the end 5 radially inwardly over the disc 6. While the extent of the lapped end may be varied to some extent, it has been found that with a lap of one (1) inch or less, preferably about three-fourths of an inch, the lap can be bent and pressed down without any objectional wrinkling. Whatever wrinkling may result, the wrinkles will be relatively small and distributed uniformly in spaced apart relation circumferentially without puckering up at different points. This is especially advantageous since the adhesive used is pressure setting or reacting, thereby resulting in uniform and even pressure being applied throughout the extent of the entire lap so that the adhesive bond will be continuous without any weak points which would result from large puckered areas in which the lap would not be securely fastened down and the pressure could not be evenly applied circumferentially throughout the lap.

The lapped portion as above described will be continuous and unbroken, and such is preferable although a lapped edge may be provided with slits 10 (FIG. 4) or cutouts 11 (FIG. 5) to set the lapped edge off in respective alternating tabs 12 and 13. The cutout 11 may be of any conformation to leave the tabs 12 with tapered side edges 14 and such that the side edges of adjacent tabs 13 will be brought in abutting relation when the lapped portion is bent over the bottom disc.

The slit portions 10 simply set off the lapped edge into tabs, and these may be advantageously employed to further cause the lapped portion to be bent over uniformly without puckering.

This adhesive film layer 7 is an emulsion having an inner solid phase and an outer liquid phase, such as Du Pont 76 or 78 manufactured by E. I. du Pont de Nemours & Company and generally consisting of 15 parts dry solids and 85 parts water, the dry solids including 5 to 50% polyvinyl alcohol, 5 to 50% unborated starch, and 5 to 50% bleached or natural clay. As a result when pressure is applied to the lapped end of the drum container, the liquid is squeezed from the solid phase of the emulsion, causing it to set or be reacted in stable form resistant to liquids. The liquid phase of the emulsion may be water.

The tubular drum containers are particularly suitable for being formed on machines such as shown in my earlier application Serial No. 714,263, filed February 10, 1958, now Patent No. 2,966,833, granted January 3, 1961, where the head is to be subjected to a very high degree of pressure.

I am aware that there may be various changes in details of construction without departing from the spirit of the invention, and, therefore the invention is claimed broadly as indicated by the appended claims.

Having thus described my invention, what I claim as new and useful and desire to secure by United States Letters Patent is:

1. The method of making a fiber container impervious to the contents of the container comprising the steps of applying a coating to the interior surface of a hollow fiber container body, said coating being impervious to the selected contents of the container, removing the coating from the marginal edge of said body adjacent an open end thereof by a process simultaneously producing a roughened and napped surface, applying pressure reactive adhesive comprising essentially a water emulsion of polyvinyl alcohol to the marginal edge of a fiber closure, inserting said closure into said open end of said body, and pressing said marginal edge of said body into contact with said marginal edge of said closure to react said adhesive by squeezing the liquid phase therefrom to secure said body to said closure and render said adhesive impervious to the selected contents of said container.

2. A method according to claim 1 in which the liquid phase of said emulsion constitutes approximately 85% thereof by weight.

References Cited in the file of this patent

UNITED STATES PATENTS

| | | |
|---|---|---|
| 541,720 | Clement | June 20, 1895 |
| 1,893,554 | Knowlton | Jan. 10, 1933 |
| 2,243,231 | Van Saun | May 27, 1941 |
| 2,350,232 | Hines | May 30, 1944 |
| 2,413,570 | Krister et al. | Dec. 31, 1946 |
| 2,577,821 | Smith et al. | Dec. 11, 1951 |
| 2,614,087 | Turnbull | Oct. 14, 1952 |
| 2,820,584 | Hendry | Jan. 21, 1958 |